United States Patent [19]

Kobayashi

[11] Patent Number: 4,860,274
[45] Date of Patent: Aug. 22, 1989

[54] INFORMATION STORAGE MEDIUM AND METHOD OF ERASING INFORMATION

[75] Inventor: Tadashi Kobayashi, Chiba, Japan

[73] Assignee: Kabushiki Kaisha Toshiba, Kawasaki, Japan

[21] Appl. No.: 46,543

[22] Filed: May 6, 1987

[30] Foreign Application Priority Data

Dec. 19, 1986 [JP] Japan .................................. 61-301485

[51] Int. Cl.⁴ ............................ G11B 7/24; G11B 7/26
[52] U.S. Cl. ..................................... 369/100; 369/275
[58] Field of Search ..................... 365/113, 119; 357/2; 346/76 L, 135.1; 369/100, 275, 284, 94

[56] References Cited

U.S. PATENT DOCUMENTS

| | | | |
|---|---|---|---|
| 3,530,441 | 9/1970 | Ovshinsky | 340/173 |
| 3,801,966 | 4/1974 | Terao | 365/113 |
| 3,971,874 | 7/1976 | Ohta et al. | 428/432 |
| 4,566,088 | 1/1986 | Yoshida et al. | 365/113 |
| 4,660,175 | 4/1987 | Strand | 365/113 |
| 4,667,309 | 5/1987 | Hennessey | 365/113 |
| 4,718,053 | 1/1988 | Sato et al. | 369/100 |
| 4,744,055 | 5/1988 | Hennessey | 365/113 |
| 4,773,060 | 9/1988 | Shimada et al. | 369/100 |

FOREIGN PATENT DOCUMENTS

| | | | |
|---|---|---|---|
| 0184452 | 6/1986 | European Pat. Off. | 365/113 |
| 0186911 | 7/1986 | European Pat. Off. | 369/100 |
| 60-177446 | 9/1985 | Japan . | |

OTHER PUBLICATIONS

Yamada et al., "Erasable Optical Disc Using $TeO_x$ Thin Film", Proceedings of Japan Display, 1983, pp. 40–48.
"Erasable Large–Capacity Optical Disk", 116th Research Meeting, 131st Committee, The Japan Society for the Promotion of Science, (May 1983), for $TeO_x$), (No Translation).

Primary Examiner—Donald McElheny, Jr.
Attorney, Agent, or Firm—Foley & Lardner, Schwartz, Jeffery, Schwaab, Mack, Blumenthal & Evans

[57] ABSTRACT

A first protective layer of $SiO_2$ is formed on a polycarbonate substrate, an In-Sb alloy recording layer containing 50 to 80 atomic % of Sb is formed on the first protective layer, a second protective layer of $SiO_2$ is formed on the recording layer, and a surface layer of an ultraviolet-curing resin is formed on the second protective layer to prepare an optical disk. In order to initialize the optical disk, the recording layer is entirely exposed to a laser beam and is transformed into a stable phase crystalline state. In order to record information in the optical disk, the recording layer is locally exposed to a laser beam and site exposed to the beam is melted. The applied site is then rapidly cooled to transform the phase into the metastable phase crystalline state, i.e., $\pi$-phase. In order to erase information from the disk, the recording mark is exposed to a laser beam and heated to a temperature higher than a temperature of phase transformation between the stable and metastable phase crystalline states but lower than the melting point of the alloy.

15 Claims, 2 Drawing Sheets

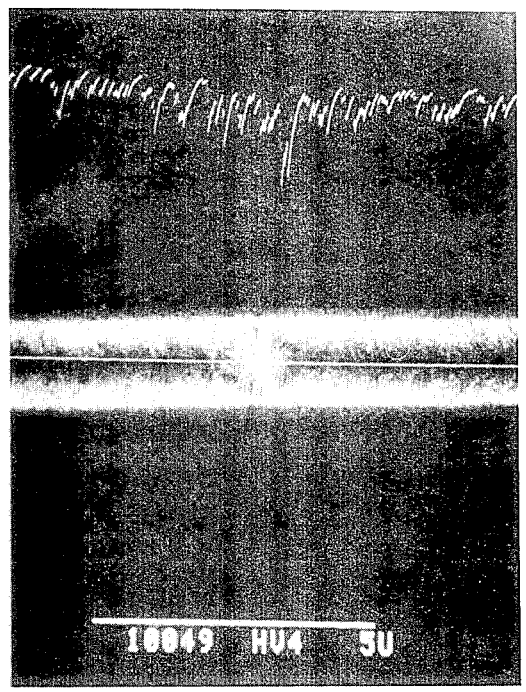
FIG. 2
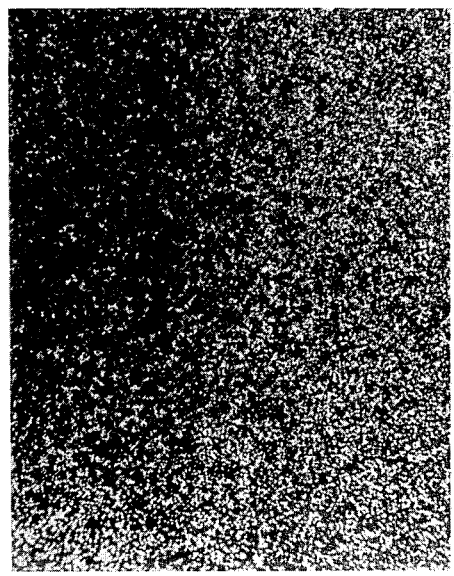 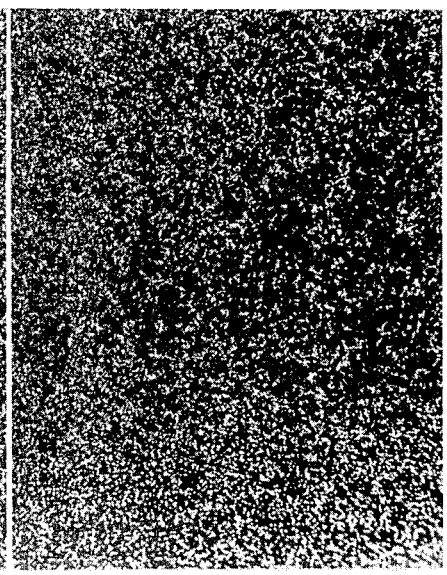
FIG. 3A  FIG. 3B

INFORMATION STORAGE MEDIUM AND METHOD OF ERASING INFORMATION

BACKGROUND OF THE INVENTION

1. Field of the Invention

The present invention relates to an information storage medium such as a so-called erasable optical disk having a recording later irradiated with a beam to cause changes in optical characteristics, thereby writing information therein or erasing it therefrom.

2. Description of the Prior Art

Some conventional erasable optical disks subjected to information erasure in addition to information read/write access utilize transformation between crystalline and amorphous phases. In a conventional optical disk of this type, the recording later is locally exposed to a beam to cause a transformation between the crystalline and amorphous phases at the applied site and to read information by utilizing different complex indices of refraction of the phases. For this reason, the optical disk is made of a material easily transformed into an amorphous phase upon beam radiation and subsequent rapid cooling. Such materials are chalcogenide-based materials such as $TeO_x$, Te-Sn-Se, and Ge-Te (see "Erasable Large-Capacity Optical Disk", 116th research meeting, 131st committee, the Japan Society for the Promotion of Science (May, 1983), for $TeO_x$).

The amorphous phase of chalcogenide-based materials, however, is not stable, and stable information recording cannot be performed. Moreover, if a material having a high crystallization temperature is used in order to stabilize the amorphous phase, it takes a long period of time to cause a transformation from the amorphous phase to the crystalline phase in the information erase mode.

SUMMARY OF THE INVENTION

It is an object of the present invention to provide an information storage medium capable of stably storing information therein and subjected to information write and erase operations at high speed.

It is another object of the present invention to provide a method of erasing information wherein recorded information can be erased with a low-power light beam within a short period of time.

An information storage medium according to an aspect of this invention comprises: a transparent substrate; and a recording layer disposed on the substrate, which comprises an alloy having a melting point of 200° to 900° C. and being capable of undergoing a phase transformation between a stable phase crystalline state and a metastable phase crystalline state; wherein the recording layer is exposed to a light beam to cause the phase transformation between the stable phase crystalline state and the metastable phase crystalline state in a site exposed to the beam, thereby writing information therein and erasing information therefrom.

An information storage medium according to another aspect of this invention comprises: a transparent substrate; a recording layer which comprises an alloy, having a melting point of 200° to 900° C. and being capable of undergoing a phase transformation between a stable phase crystalline state and a metastable phase crystalline state; a first protective layer disposed between the substrate and the recording layer; and a second protective layer disposed on the recording layer; wherein the recording layer is exposed to a light beam to cause the phase transformation between the stable phase crystalline state and the metastable phase crystalline state in a site exposed to the beam, thereby writing information therein and erasing information therefrom.

A method of erasing information comprises: providing an information storage medium comprising a transparent substrate, and a recording layer comprising an alloy having a melting point of 200° to 900° C. and capable of undergoing a phase transformation between a stable phase crystalline state and a metastable phase crystalline state, the recording layer being provided with a recording mark in the stable phase crystalline state; and applying a light beam to the recording mark to heat it to a temperature higher than a temperature of phase transformation between the stable and metastable phases but lower than the melting point of the recording layer, thereby causing the phase transformation from the metastable phase crystalline state to the stable phase crystalline state and hence erasing the information.

According to the present invention, information can be written and erased by a phase transformation between the crystalline phases in an alloy constituting the recording layer. The crystalline phase is stably maintained in both the stable and metastable states at room temperature. Therefore, the recorded information can be stored stably. Furthermore, since the melting point of the alloy constituting the recording layer is relatively low, the phase transformation temperatures are accordingly low. Moreover diffusion of atoms required for the phase transformation between the crystalline phases is comparatively little. Therefore, the site of the recording layer exposed to the beam, is subjected to the phase transformation in a very short period of time, and thus information can be recorded and erased at high speed.

Furthermore, the major surfaces of the recording layer are covered by the protective layers, and the recording layer can be effectively protected from damage caused by beam radiation. As a result, information can be stored with still higher stability.

Since information is recorded and erased by the phase transformation between the stable and metastable phase crystalline states, the light beam can be applied to the recording mark to heat it to a temperature higher than the phase transformation temperature but lower than the melting point of the recording layer, thereby erasing the information. In this case, since an alloy having a temperature of as low as 200° to 900° C. is used to form the recording layer, the phase transformation temperature is very low. In the information erasure described above, a light beam having a low output can be used to erase the information at a higher speed. Moreover, information can be erased with the light beam having a low output without causing melting of the recording mark. Therefore, the erasure portion is not degraded, and repetition of recording and erasure does not degrade the recording characteristics.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, in which:

FIG. 2 is a photograph showing the results of Sb linear analysis of a recording mark of an InSb recording layer;

FIG. 3A is a photograph showing the results of In planar analysis of the InSb recording layer; and FIG. 3B is a photograph showing results of Sb planar analysis of a recording layer as in FIG. 3A.

DETAILED DESCRIPTION OF THE PREFERRED EMBODIMENT

Figure 1:
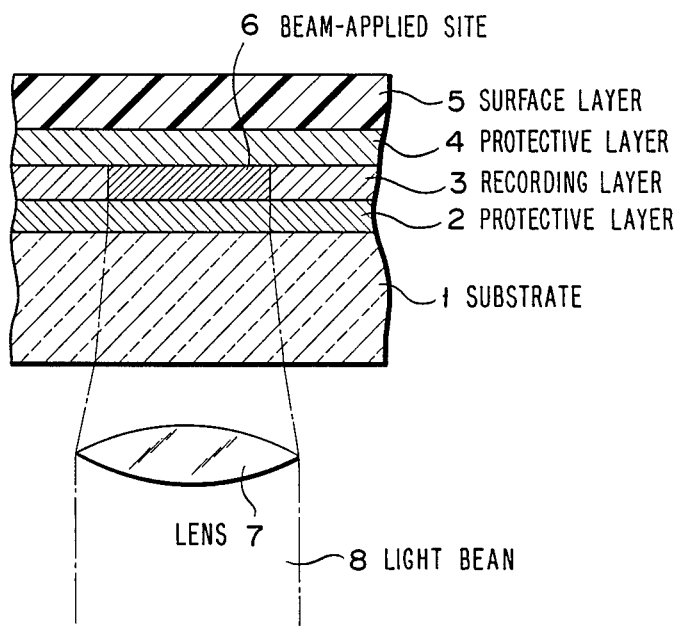
FIG. 1 is a sectional view of an information storage medium (optical disk) according to an embodiment of the present invention.

The present invention will be described in detail with reference to a preferred embodiment in conjunction with the accompanying drawings. FIG. 1 is a sectional view of an information storage medium (optical disk) according to an embodiment of the present invention. Substrate 1 is made of a transparent material which is not easily deteriorated over time and is exemplified by glass, quartz, polymethylmethacrylate (PMMA) resin, polycarbonate resin (PC), or epoxy resin. Protective layer 2, recording layer 3, and protective layers 4 and surface layer 5 are formed on substrate 1 in the order named. Protective layers 2 and 4 sandwich recording layer 3 therebetween. Protective layers 2 and 4 need not be formed. However, formation of these layers prevents scattering of recording layer 3 and formation of holes therein by application of a laser beam. Protective layers 2 and 4 may be formed by depositing or sputtering a dielectric such as $SiO_2$, SiO, or AlN. The thickness of each of protective layers 2 and 4 preferably falls within the range of 1 nm to 10 μm.

Surface layer 5 is formed to prevent recording layer 3 from damage such as scratches during handling of the optical disk. Surface layer 5 is formed of a material having high adhesion strength with protective layer 4. Surface layer 5 can be formed by applying an ultraviolet (UV) curing resin on protective layer 4 and curing the resin upon radiation of ultraviolet rays.

Recording layer 3 is made of an alloy having a melting point of 200° to 900° C. and being capable of undergoing a phase transformation between a stable phase crystalline state and a metastable phase crystalline state, when a light beam, such as a laser beam, is applied to recording layer 3. The phase transformation temperature of the alloy is lower than the melting point thereof. Therefore, if the melting point of the alloy is lower than 200° C., a phase transformation tends to occur at a low temperature, thereby degrading storage characteristics of information at room temperature. If the melting point is higher than 900° C., a phase transformation requires a long period of time.

Examples of such an alloy are an Au-Bi alloy containing 70 to 80 atomic % of Bi, an Au-Bi alloy containing 55 to 65 atomic % of Bi, an Au-Bi alloy containing 45 to 55 atomic % of Bi, an Au-Sb alloy containing 5 to 25 atomic % of Sb, an Au-Sb alloy containing 70 to 90 atomic % of Sb, an In-Sb alloy containing 30 to 45 atomic % of Sb, an In-Sb alloy containing 50 to 80% of Sb, a Pb-Sb alloy containing 30 to 40 atomic % of Sb, and a Pb-Sb alloy containing 40 to 70 atomic % of Sb.

These alloys have low melting points as described above and can be easily melted with radiation of a low-output light beam. In order to transform the phase of such an alloy from the stable phase crystalline state to the metastable phase crystalline state, the alloy is melted to prevent remaining of stable-phase components and then rapidly cooled. In this case, since the melting point of the alloy is low, melting can be performed in a very short period of time. As a result, the phase of the alloy can be transformed from the stable phase to the metastable phase in a very short period of time. The temperature of phase transformation between the stable and metastable phases is as low as 100° to 300° C. If the alloy includes a portion in the metastable phase crystalline state, the alloy can be heated to temperature low as 100° to 300° C. in order to transform this portion into a stable phase crystalline state, thus achieving a phase transformation in a very short period of time. In addition, the phase transformation is limited to that between crystalline phases, and is not attended with phase separation, therefore diffusion of atoms required for the phase transformation can be comparatively little, thus further shortening the phase transformation time. The above alloys are stable at room temperature even in a metastable crystalline state, since the phase transformation temperature of the alloys is higher than room temperature.

When an In-Sb alloy containing 50 to 80 atomic % of Sb is used to form recording layer 3, recording layer 3 is exposed to a laser beam having predetermined conditions and is melted. The layer is rapidly cooled according to splat cooling or the like to change the stable phase crystalline state to the π-phase (metastable phase) crystalline state. When the π-phase alloy is applied to a laser beam having predetermined conditions and is heated to a temperature higher than the phase transformation temperature, the π-phase crystalline state is transformed back into the stable phase crystalline state. In this case, the π-phase crystalline state is transformed into the stable phase crystalline state at a temperature as low as 100° to 300° C. but is stable at room temperature.

The thickness of recording layer 3 preferably falls within the range of 1 nm to 5 μm. Layer 3 can be formed by multi-element co-sputtering or co-deposition using elements constituting the alloy. Layer 3 may be formed by sputtering or deposition using a single alloy material.

The operation of the optical disk prepared as described above will be described below. In the optical disk, as shown in FIG. 1, light beam 8 such as a laser beam emitted from a light source (not shown) is focussed by lens 7, and recording layer 3 is exposed to the focussed laser beam from the side of substrate 1.

Initialization

In order to record information, recording layer 3 must be maintained in a stable phase crystalline state. If the formed recording layer is held in the amorphous or metastable crystalline state, the layer must be converted into the stable phase crystalline state prior to use of the optical disk. Initialization of the optical disk is performed as follows. Recording layer 3 is heated to a temperature exceeding the crystallization temperature (if the layer is amorphous) or to a temperature exceeding the phase transformation temperature for changing the metastable phase crystalline state into the stable phase crystalline state (if the layer has the metastable phase). Heating of recording layer 3 in the metastable phase crystalline state may be performed until recording layer 3 is melted. Heating may be performed using a heater, or the light beam is applied to the entire surface of recording layer 3. After heating, recording layer 3 is gradually cooled to prevent phase transformation into an amorphous state or a metastable phase.

Recording

In order to record information, recording layer 3 maintained in the stable phase crystalline state is selectively exposed to a laser beam to melt only beam-applied site 6. Beam-applied site 6 is rapidly cooled to transform its state into a metastable phase crystalline state. Beam-applied site 6 serves as a recording mark. In this case, the light beam is preferably a pulsed laser beam having a short period of 10 nsec to 2 μsec. The output power of the laser beam is set to melt beam-applied site 6 by one pulse. When a conventional semiconductor laser is used, the output power falls within the range of 5 to 30 mW. By rapid cooling of the recording mark (site 6), this site is transformed into the metastable phase crystal state. In other words, information is written in site 6. In this case, the metastable phase crystal is stable at room temperature and thus information can be stored stably.

Reading

Information recorded in recording layer 3 can be read from the recording mark (beam-applied site 6) exposed to a laser beam by detecting an intensity of light reflected by the recording site. Since the reflectance of the surface as the stable phase crystal is different from that of the surface as the metastable phase crystal, the difference between beam densities reflected by these surfaces is detected to determine whether the beam is reflected by the stable or metastable phase crystal.

Erasing

The recording mark (site 6) of recording layer 3 is exposed to a laser beam having a power smaller than that in the information recording mode, and is heated to a temperature lower than the melting point of the alloy constituting recording layer 3 but higher than the temperature of phase transformation from the metastable phase crystalline state to the stable phase crystalline state. The recording mark 6 of recording layer 3 is transformed into the stable phase crystal, thus erasing information from the recording mark 6. In this case, the entire disk may be heated to a temperature exceeding the phase transformation temperature by a heater or the like. Alternatively, only beam-applied site 6 of recording layer 3 may be sequentially exposed to a laser beam spot. The phase transformation from the metastable phase crystal to the stable phase crystal requires only a short period of time as compared with the transformation from the amorphous phase to the crystalline phase since the phase transformation temperature is low and comparatively diffusion of atoms is required. Therefore, information can be erased at high speed. The alloy forming recording layer 3 has a melting point of 200° to 900° C. Moreover, recording layer 3 is heated to a temperature lower than the melting point thereof to undergo the phase transformation from the metastable phase to the stable phase. Therefore, the light beam having a low output can be used to erase the information at a higher speed. In the conventional case wherein the recording mark is melted and then rapidly cooled to erase information, a light beam having a high output is required and degassing and solidification contraction occur at the time of alloy solidification. Therefore, the erasure portion is deformed and cracked. If recording and erasing are repeated, the erasing portion is greatly degraded. However, according to the erasure method of the present invention, the above conventional problem is not posed. Even if recording and erasing are repeatedly performed, degradation of the recording characteristics can be minimized.

A sample is prepared by forming a recording layer of a thin In-Sb alloy film and a recording mark is formed in the recording layer. Under these conditions, the recording layer is analyzed by TEM-XMA and electron beam diffraction.

FIG. 2 is a photograph showing results of linear analysis of Sb in the recording mark of the sample by TEM-XMA. According to this photograph, segregation of Sb is not found in the recording mark.

FIG. 3A is a photograph showing results of In planar analysis of the recording layer of the sample by TEM-XMA, and FIG. 3B is a photograph showing results of Sb planar analysis. Segregation of In and Sb is not found in the recording mark and recording track having no information therein.

Table 1 shows analytic results of the recording track having no information therein and the recording mark according to electron beam diffraction.

TABLE 1

| | Central Portion of Recording Track Having no Information | Central Portion of Recording Mark | Peripheral Portion of Recording Mark |
|---|---|---|---|
| Main Phase | fine InSb | coarse π-phase | coarse π-phase |
| Other phases | fine Sb and/or π-phase | fine InSb (fine Sb) | fine InSb (fine Sb) |

As is apparent from the above table, the main phase of the recording site was a coarse metastable π-phase, and the central portion of recording track having no information was an InSb fine crystal.

As described above, the In and Sb distributions of the recording layer are substantially uniform. Since the recording mark had the π-phase and the recording track central portion having no information was fine InSb, it was confirmed that information recording and erasing were caused by the phase transformation between the stable and metastable phase crystalline states and that the composition of the recording layer itself did not change.

What is claimed is:

1. An information storage medium comprising:
    a transparent substrate; and
    a recording layer disposed on said substrate which comprises an alloy having a melting point of 200° to 900° C., and being capable of undergoing a phase transformation between a stable phase crystalline state and a metastable phase crystalline state;
    wherein said recording layer is exposed to a light beam to cause the reversible phase transformation between the stable phase crystalline state as an erasing state and the metastable phase crystalline state as a recording state in a site exposed to the beam, thereby recording information therein and erasing information therefrom.

2. A medium according to claim 1, wherein said recording layer contains at least one alloy selected from the group consisting of an Au-Bi alloy containing 70 to 80 atomic % of Bi, an Au-Bi alloy containing 55 to 65 atomic % of Bi, an Au-Bi alloy containing 45 to 55 atomic % of Bi, an Au-Bi alloy containing 5 to 25 atomic % of Sb, an Au-Bi alloy containing 70 to 90 atomic % of Sb, an In-Sb alloy containing 30 to 45 atomic % of Sb, an In-Sb alloy containing 50 to 80 atomic % of Sb, a Pb-Sb alloy containing 30 to 40 atomic % of Sb, and a Pb-Sb alloy containing 40 to 70 atomic % of Sb.

3. A medium according to claim 2, wherein the temperature of the phase transformation between the stable phase crystalline state and the metastable phase crystalline state falls within a range of 100 20 to 300° C.

4. A medium according to claim 1, wherein said recording layer is exposed to the light beam and then the site exposed to the light beam is rapidly cooled to transform the stable phase crystalline state into the metastable phase crystalline state, thereby recording the information.

5. A medium according to claim 1, wherein the information is recorded in said recording layer, said recording layer is exposed to the light beam to heat the site exposed to the light beam to a temperature higher than a phase transformation temperature between the stable and metastable phase crystalline states but lower than a melting point of said recording layer, thereby transforming the metastable phase crystalline state into the stable phase crystalline state and hence erasing the information.

6. A medium according to claim 1, wherein said recording layer has a thickness falling within a range of 1 nm to 5 $\mu$m.

7. A recording storage medium comprising:
a transparent substrate; and
a recording layer which comprises an alloy having a melting point of 200° to 900° C., and being capable of undergoing a phase transformation between a stable phase crystalline state and a metastable phase crystalline state;
a first protective layer formed between said substrate and said recording layer; and
a second protective layer formed on said recording layer;
wherein said recording layer is exposed to a light beam to cause the reversible phase transformation between the stable phase crystalline state as an erasing state and the metastable phase crystalline state, as a recording state in a site exposed to the beam, thereby recording information therein and erasing information therefrom.

8. A medium according to claim 7, wherein said recording layer contains at least one alloy selected from the group consisting of an Au-Bi alloy containing 70 to 80 atomic % of Bi, an Au-Bi alloy containing 55 to 65 atomic % of Bi, an Au-Bi alloy containing 45 to 55 atomic % of Bi, an Au-Sb alloy containing 5 to 25 atomic % of Sb, an Au-Sb alloy containing 70 to 90 atomic % of Sb, an In-Sb alloy containing 30 to 45 atomic % of Sb, an In-Sb alloy containing 50 to 80 atomic % of Sb, a Pb-Sb alloy containing 30 to 40 atomic % of Sb, and a Pb-Sb alloy containing 40 to 70 atomic % of Sb.

9. A medium according to claim 8, wherein the temperature of the phase transformation between the stable phase crystalline state and the metastable phase crystalline state falls within a range of 100° to 300° C.

10. A medium according to claim 7, wherein said recording layer is exposed to the light beam and then the site exposed to the light beam is rapidly cooled to transform the stable phase crystalline state into the metastable phase crystalline state, thereby recording the information.

11. A medium according to claim 7, wherein the information is recorded in said recording layer, said recording layer is exposed to the light beam to heat the site exposed to the light beam to a temperature higher than a phase transformation temperature between the stable and metastable phase crystalline states but lower than a melting point of said recording layer, thereby transforming the metastable phase crystalline state into the stable phase crystalline state and hence erasing the information.

12. A medium according to claim 7, wherein said recording layer has a thickness falling within a range of 1 nm to 5 $\mu$m.

13. A medium according to claim 7, wherein said first and second protective layers are made of an inorganic dielectric.

14. A medium according to claim 13, wherein said first and second protective layers have a thickness of 1 to 10 $\mu$m each.

15. A method of erasing information comprising:
providing an information storage medium comprising a transparent substrate and a recording layer comprising an alloy having a melting point of 200° to 900° C. and capable of undergoing a phase transformation between a stable phase crystalline state and a metastable phase crystalline state, said recording layer being provided with a recording mark in the stable phase crystalline state; and
applying a light beam to said recording mark to heat it to a temperature higher than a temperature of phase transformation between the stable and metastable phases but lower than the melting point of said recording layer, thereby causing the phase transformation from the metastable phase crystalline state to the stable phase crystalline state and hence erasing the information.

* * * * *